United States Patent [19]
Youngquist

[11] 4,351,007
[45] Sep. 21, 1982

[54] EDITOR FOR COMBINING DIGITALLY RECORDED AUDIO SIGNALS

[75] Inventor: Robert J. Youngquist, White Bear Lake, Minn.

[73] Assignee: Minnesota Mining and Manufacturing Company, Saint Paul, Minn.

[21] Appl. No.: 226,616

[22] Filed: Jan. 21, 1981

Related U.S. Application Data

[63] Continuation-in-part of Ser. No. 68,070, Aug. 1, 1979.

[51] Int. Cl.³ .............................................. G11B 27/02
[52] U.S. Cl. ..................................................... 360/13
[58] Field of Search .................................... 360/13, 32

[56] References Cited

U.S. PATENT DOCUMENTS 3,152,227 10/1964 Durio ..................................... 360/13
3,575,552 4/1971 Grant et al. ............................ 360/13
3,733,444 5/1973 French, Jr. ............................. 360/13
4,067,049 1/1978 Kelley et al. .......................... 360/13
4,179,712 12/1979 Opelt ..................................... 360/14

Primary Examiner—Vincent P. Canney
Attorney, Agent, or Firm—Cruzan Alexander; Donald M. Sell; William B. Barte

[57] ABSTRACT

An apparatus for editing digitally recorded audio signals in which entry and exit edit points are designated based on a display of data derived from audio signal data proximate to the edit points. The apparatus enables the automatic selected and combination of portions of audio signals on at least two channels to produce a composite audio signal digitally recorded on a record medium.

16 Claims, 4 Drawing Figures

EDITOR FOR COMBINING DIGITALLY RECORDED AUDIO SIGNALS

This is a continuation-in-part of U.S. Ser. No. 68,070, filed Aug. 1, 1979, which in turn relates to Ser. No. 72,076, filed Sept. 4, 1979 (now U.S. Pat. No. 4,249,218) which is a continuation of Ser. No. 956,580, filed Nov. 1, 1978 by Messrs. Donald E. Davis and Robert J. Youngquist, now abandoned.

BACKGROUND OF THE INVENTION

1. Field of the Invention

This invention relates to a method and apparatus for editing and combining selected portions of previously recorded audio signals to form a composite record audio signal.

2. Description of the Prior Art

Digital recording of audio signals on magnetic tape has been shown to offer significant performance improvements over traditional analog recording methods. However, to be fully exploited, all functions of the recording studio should be performed in the digital domain.

One function performed in the recording studio is editing. Editing refers to a process where selected audio signals recorded on separate channels of at least one tape medium are concatenated to form an edited, composite audio signal. In prior art analog systems this is typically accomplished by physically cutting the record medium and splicing appropriate sections of the medium together.

This cut and splice technique is virtually impossible to perform successfully on digitally recorded tapes because a splice introduces physical tape distortions which prevent accurate audio signal reconstruction.

Accordingly in the digital domain, audio signals are edited by a copying process. Selected portions of the audio signals present on different channels of a record medium are copied onto a separate channel of a medium to produce an edited audio signal. The selected portions of the audio signal are defined by edit points which are designated audio signal data words which define a physical location on the record medium. Typically, an entry and exit edit point will be designated to define each selected audio portion. When the entry point for the selected portion is reached, audio signal data will be transferred by a copying process from the channel on which the audio signal is present to another separate master channel. When the exit point for that selection is reached, the copying process for the selected audio section will be completed and a new audio signal from another channel will be transcribed onto the master channel.

The primary problem in defining editing points for digitally recorded audio signals involves the location of a position within the selected audio signals where a splice may be implemented without causing audible distortion of the audio waveforms at that point. Once aurally adequate edit points have been determined, it is further required that the transcribing process be performed precisely at the designated edit points. This synchronization is required because the various audio signals may have been recorded at different times on different record media.

One prior art approach to editing digitally recorded audio signals involves copying the audio signals onto a magnetic disk memory where they are manipulated and edited to form a composite or master signal on the disk medium. The principal limitation of this prior art approach is the inability to store more than a few minutes of audio signals on a disk memory.

SUMMARY OF THE INVENTION

In order to overcome such limitations, the present invention is directed to an editing apparatus and method which permits the editing of long duration digitally encoded audio signals and which provides a means for automatically executing an edit function. In one embodiment, the edit function is achieved by synchronizing two media transports and transferring audio signals precisely at spatial locations defined by designated edit points.

The apparatus enables a method for editing and combining selected portions of digitally encoded audio signals recorded on at least one record medium to form a composite digitally encoded audio signal. The basic method comprises the steps of:

First, designating tentative entry and exit edit point words defining the spatial locations of selected portions of the audio signals to be edited. In the fully automated embodiment disclosed and claimed in the above-referenced application Ser. No. 72,076 by Messrs. Robert J. Youngquist and Donald E. Davis, the tentative edit points and the audio signals proximate to the tentative edit points are then stored. Next, a representation of the audio signal surrounding the edit points is displayed, in which the representation is indicative of the average amplitude of audio signal data words. In the present invention, audible displays of the audio signals recorded on at least one record medium are reproduced and the tentative exit and entry edit point words defining the spatial locations of selected portions of the reproduced signals to be joined in sequence to form the compsite signal are designated in response to the audible displays. The edit point words are stored, thus enabling subsequent identification of the spatial location of signals at which an edit is desired. The tentative edit point words are then refined by modifying in steps of discrete time intervals of decreasing duration the spatial location of the edit point words, based on repeated audible displays of selected portions of the reproduced signals. The spatial locations of these refined edit point words are then stored. The selected portions of the audio signals which are defined by the refined edit point words are then combined to form the composite audio signal by switching between the audio signals at spatial locations defined by the refined edit point words.

Controller means for accomplishing this method are provided which define, locate and automatically combine the selected portions of the digitally recorded signals at the refined edit points.

DETAILED DESCRIPTION OF THE PREFERRED EMBODIMENT

Figure 1:
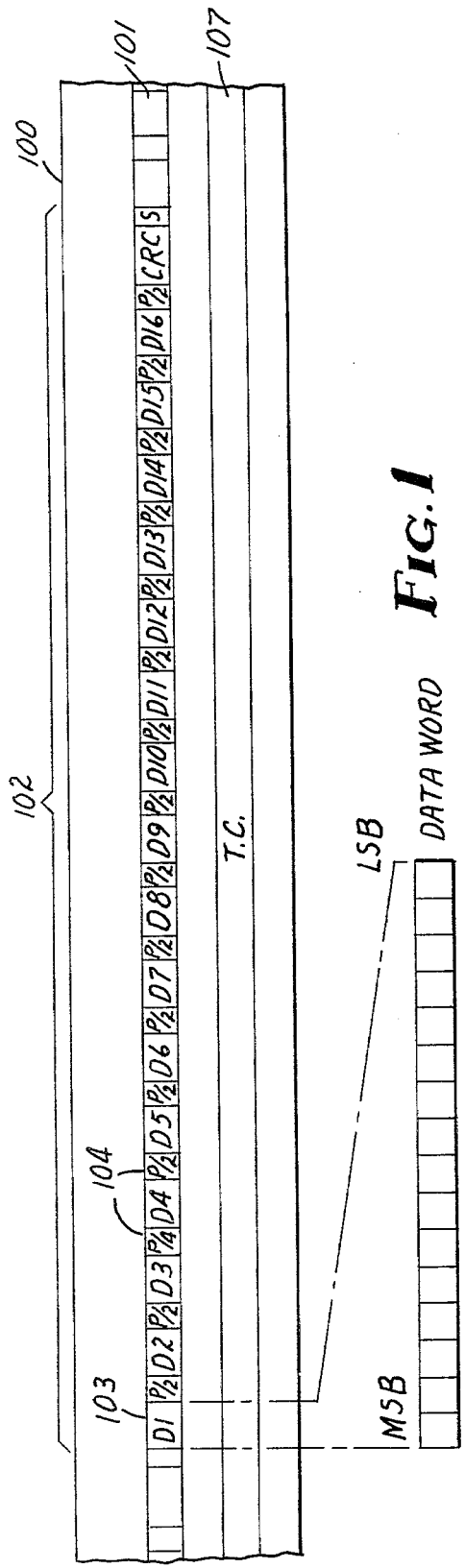
FIG. 1 is a diagram showing the encoding scheme for recording audio signals in a digital format on magnetic tape medium.

FIG. 1 shows a record medium 100 having a single channel 101 of audio signal data recorded thereon. In a typical embodiment, the record medium is selected to be a 1 inch wide magnetic tape which may have recorded thereon up to 31 separate channels of audio signal data and one channel 107 of time code information. The audio signal data is recorded in frames which are 400 bits long. Each frame 102 consists of 16 data words ($D_1$–$D_{16}$). Each data word 103 is 16 bits long and encodes a sample of the audio signal waveform. The data words are separated by 8 parity words (P). Each half parity word (P/2) 104 is 8 bits long and is used for error correction. Each frame 102 of data ends with a 12 bit cyclical redundancy check word (CRC) 105, and a 4 bit synch word (S) 106. These words are used for error detection and synchronization respectively. Also shown recorded on the record medium 100 in FIG. 1 is a time code channel 107, within which digital data representing the time at which the digitally encoded audio signals in the other channel 101 were received. Such time code data is desirably recorded in frames or blocks of generally the same nature as that of the audio signal frames. In one embodiment, a given time code frame, while extending a full 400 bits in length so as to correspond to the 400 bit audio data frame, may contain only 24 bits of raw data which simply numerically identifies each frame, the remainder of the frame being blank, other than for a 12 bit CRC word and a 4 bit sync word located at the end of each frame as in the audio signal frames. Desirably, the 24 bits of time related data are similarly broken into 16 bit words, each of which is separated by an 8 bit parity word. Since no error correction enabling parity words are generally required, the 24 bits of time data may be conveniently broken into a 16 bit word containing the most significant portion, followed by 8 blank bits, in turn followed by a second 16 bit word, only half of which represents data, it containing the remaining least significant 8 bits of data. In other embodiments, error correction enabling parity words may be interspersed. Alternatively, 80 bit SMPTE time code information such as that conventionally employed to label video data frames may be utilized in place of the 24 bit code previously described. Such SMPTE time codes may also be recorded after the 24 bit code, but within each frame to enable either time code system to be utilized during reproduction operations.

Edit point words used to define exit edit points at which signals from a first set of audio signals are terminated and entry edit points at which signals from a second set of signals commence are preferably established by the time code information associated with a given frame, i.e., the 24 bit digital number is thus utilized as an edit point word. Since information is read from or written on the record medium at a rate of approximately 3125 frames per second (a nominal tape speed of 45 inches per sec.), each frame contains 0.32 milliseconds of audio data. Edit point words identifying a given frame thus enable an edit to be made which is accurate within 0.32 milliseconds.

Figure 2:
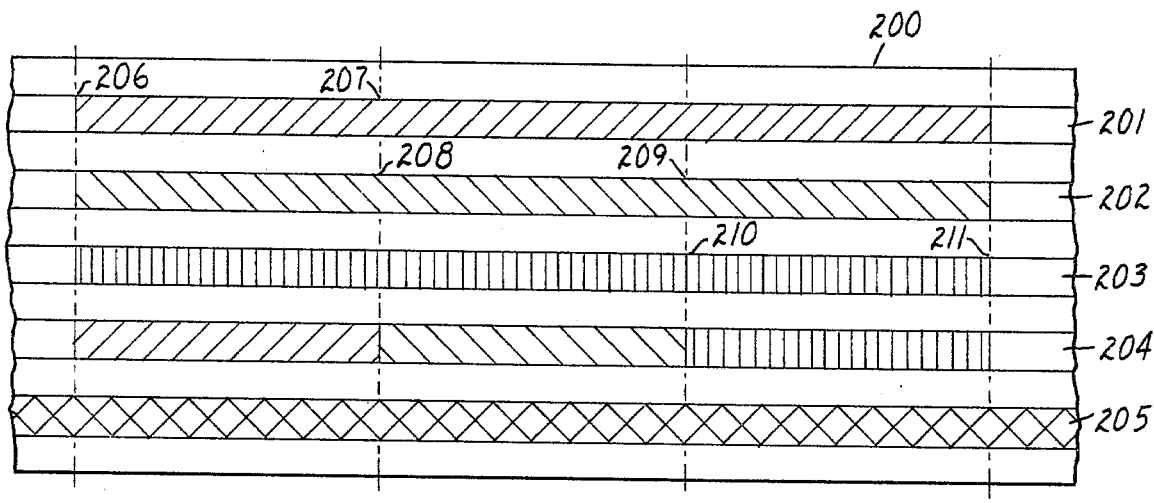
FIG. 2 is a diagram showing a typical edit performed on one record medium.

FIG. 2 is a diagram showing a typical edited tape where the record media 200 has 4 audio signal channels 201–204 and a time code channel 205. As shown in the diagram, information from channel 201, 202 and 203 are combined to form an edited composite signal recorded on channel 204. The editing process is accomplished by designating entry and exit points for each of the audio signals. Edit points which correspond to designated audio signal data words are selected for each audio signal channel. For example the edit points for the first channel 201 are shown as entry edit point 206 and exit edit point 207. When edit point 206 is reached, the audio signal from the first channel 201 is transcribed onto the fourth channel 204. When the end of the selected audio portion is reached as indicated by reaching edit point 207, audio signal information defined by edit point 208 on the second channel 202 is transcribed onto the fourth channel 204. When the exit edit point 209 on the second channel is reached, information designated by entry edit point 210 on the third channel 203 is transcribed onto channel 204. In this fashion, a composite audio signal on channel 204 is developed by switching between designated channels at positions defined by the selected edit points. It should be clear from FIG. 2 that this form of edit is only possible when the selected audio portions have been recorded simultaneously on the same record medium.

In most instances, however, selected portions of audio signals will not have been recorded on the same record media and as a consequence will not be available for the editing procedure shown in FIG. 2.

Figure 3:
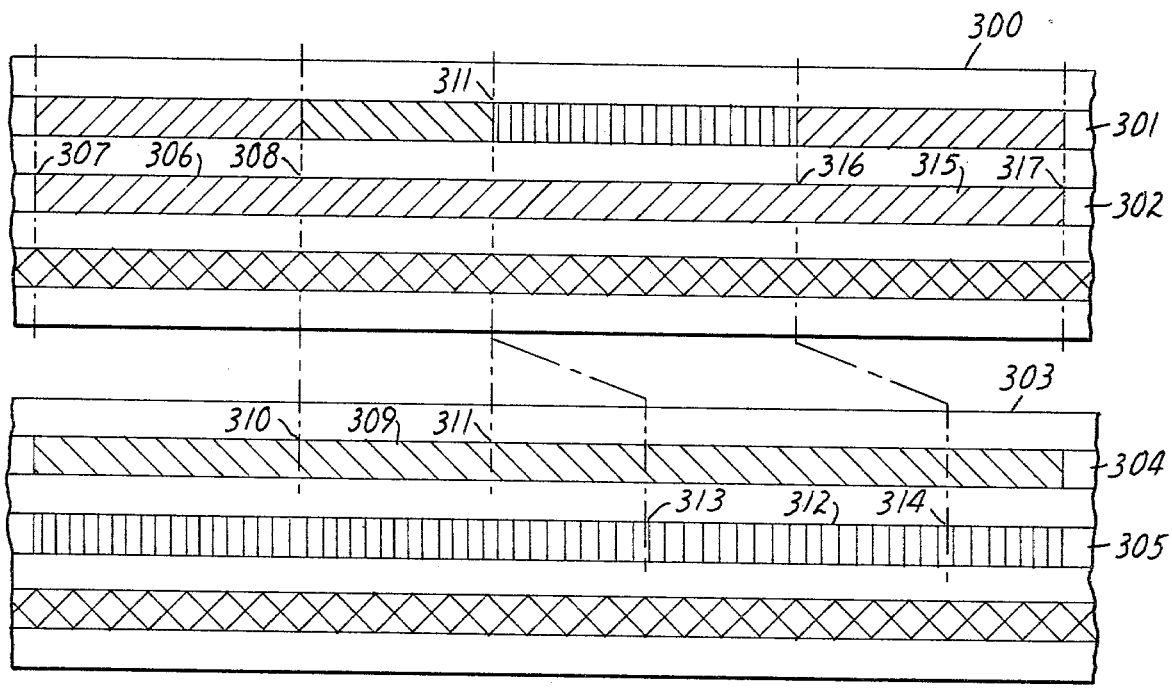
FIG. 3 is a diagram showing a typical edit performed between two record media.

FIG. 3 shows the technique for combining selected portions of audio signals recorded on separate channels or tracks of separate record media in the form of recording tapes. In FIG. 3 a first record medium 300 has separate channels (tracks) labeled 301 and 302 together with a time code channel (T.C.). The second record medium 303 has audio signal data recorded on separate channels (tracks) 304 and 305 together with a time code channel (T.C.). The composite or edited master channel is shown as channel 301 on tape medium 300. In this edit, material present on channel 302 of medium 300 and information recorded on channel 304 and 305 of medium 303 are combined on channel 301 of media 300. To perform this type of arbitrary splice, edit points for each of the selected audio signals are defined, and the composite channel 301 is formed by selectively combining selected audio portions 306, 309, 312 and 315.

This is accomplished by defining entry and exit edit points for each of the selected audio portions. To perform the above described, entry and exit edit points 307 and 308 respectively for portion 306, are defined. Information is transferred from channel 302 to channel 301 at these edit points. Copying audio portion 309 on channel 304 of medium 303 requires that the two tape media 300 and 303 be synchronized at the entry edit point 310 of audio portion 309. This function is performed by controller apparatus which locates the exit edit point 308 on channel 302 and the entry edit point 310 on channel 304 and synchronizes the tape media at these edit point positions. Once the tape media are effectively slaved together at the edit points, the digitally encoded audio signals within portion 309 are transferred from channel 304 to channel 301 when exit edit point 308 and entry edit point 310 are reached. When the end of portion 309 is reached by detecting exit edit point 311, the tape media must again be re-synchronized so that the beginning of audio portion 312 defined by entry edit point 313 coincides with the exit edit point 311 on the composite channel 301. The tape media are rewound and the speed of the transports are adjusted such that the exit edit point 311 now on channel 301 coincides with entry edit point 313 of channel 305. When these edit points are aligned and synchronized, the digitally encoded audio signals within portion 312 on channel 305 are transferred onto channel 301, thus splicing the audio portion 312 onto the master channel 301. When the exit edit point 314 is reached, the audio signals within portion 315 are transferred from channel 302 indicated by entry edit point 316 and the signals on channel 302 are transcribed until the exit edit point 317 is reached.

It should be clear that long duration edits of an arbitrary length can be accomplished by selectively copying, and if necessary, recopying selected audio portions to compile a master channel.

The alignment and location of selected audio portions is governed by a control system which automatically positions and synchronizes tapes to enable transfer of signals from and to the appropriate channels of recorded media at selected exit and entry edit points.

Figure 4:
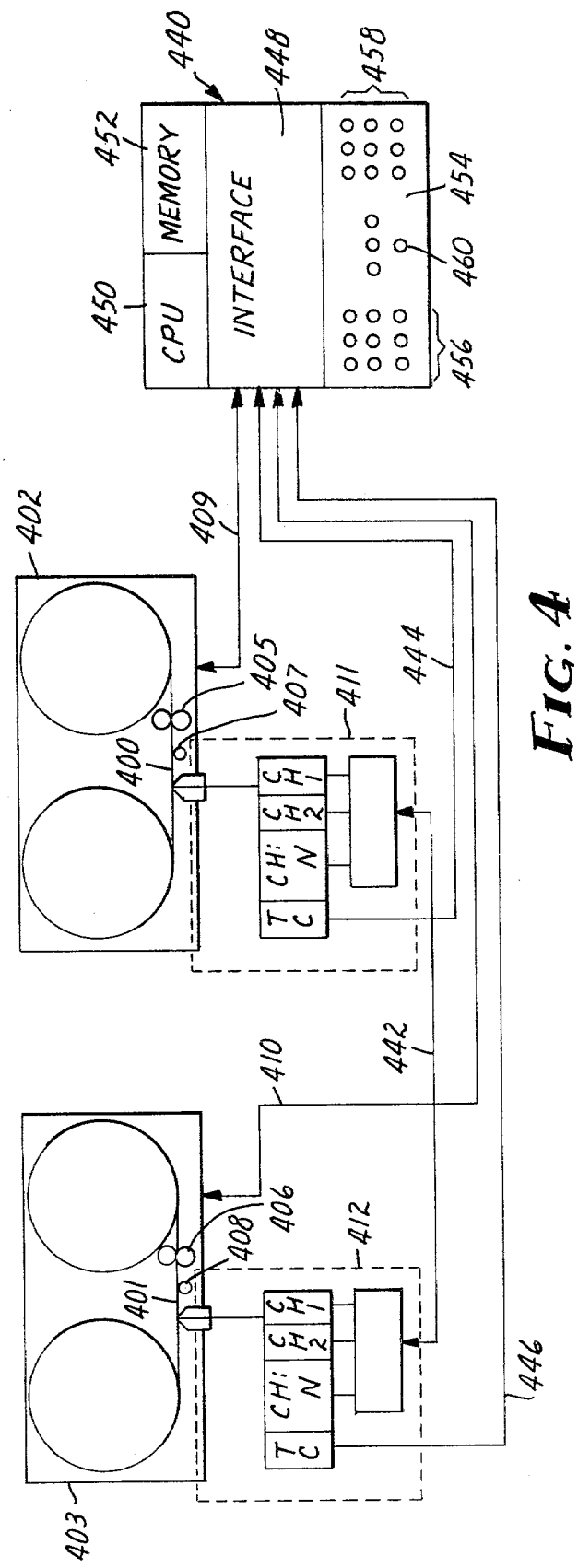
FIG. 4 is a block diagram representing the controller means of the present invention.

FIG. 4 shows the controller apparatus for performing the editing functions.

Separate recording media 400 and 401 are transported by a transport means such as the separate transport mechanisms 402 and 403, respectively. The operation of these transports are controlled by the controller 440 which controls variable speed capstans 405 and 406 via communication lines 409 and 410. Each transport is provided with a position indicator means 407 and 408 which contacts the recording media and provides a continuous record of media position information which is communicated to the controller 440 over communication lines 409 and 410. It is thus clear that the communication lines 409 and 410 comprise a number of leads enabling various control functions and transport status to be communicated as required. The control functions provided from the controller 440 via the interface 448 thus include stop, play, record, fast forward and rewind commands which are initiated by the appropriate keys on keyboard 458 in conjunction with the automatic control sequences under control of the CPU 450. The transport status signals are generated by the position indicators 407 and 408, which further comprise a tape direction indicator, an indicator responsive to extent of tape movement (i.e. footage counter) from which the CPU 450, via the interface 448 can determine the actual transport mode, as opposed to any requested modes. Read/write means which include multiple channel read and write heads, and associated electronic circuitry 411 and 412 are in contact with the recording media 400 and 401 to read and write digital information onto the recording media. The read/write means associated with each channel of each transport are directly coupled to preselected read/write means of one of the channels of the other transport via interconnect cable 442. Desirably, separate read and write heads are utilized, in which the read heads are spatially separated from the write heads a distance along the tape path sufficient to allow signals to be read from the tape, processed and rerecorded via the write heads in the precise same position so that on subsequent playback, the signals appear continuous. Accordingly, such processing may include error correction for drop outs, etc. and other signal modifications such as cross-fading discussed in more detail hereafter.

Time code information, which in a preferred embodiment is used as the exit and entry edit point words, is read from the media 400 and 401 and is coupled via leads 444 and 446 together with clock pulses to the interface 448 of controller 440.

The controller 440 further includes a central processor unit (CPU) 450, memory 452 and keyboard 454.

In operation, the system operator will place the tape transports in the playback mode and will listen to the recorded audio signals. The operator will then designate the tentative entry and exit edit points for the audio data by pressing an edit locate key on keyboard 454 which causes a coarse indication of the tape position provided by the position indicators 407 and 408 and a fine indication of the tape position as evidenced by the time code, via leads 444 and 446, to be transferred into memory 452 associated with the controller 440. Next, a shuttle key on the keyboard 454 is activated to shuttle the tape past the tentative edit points and the audio signal immediately preceding or following the appropriate point is audibly displayed. Optionally, the audio signal data proximate to the tentative entry point is also stored in order to allow audible display of the proximate data independent of the tape.

Based on the audible display, refined edit point words are selected and stored, thus enabling subsequent identification of the new spatial locations corresponding to the selected audio portions. This refinement is accomplished by means of sets of keys 456 and 458 on keyboard 454, each set being associated with one of the transports 402 and 403. Each set of keys enables the spatial location of the selected audio portions defined by the exit and entry edit point words to be modified in steps of discrete time intervals of decreasing duration, i.e. in steps of 30, 10, 3 and 1 millisecond. The combination of the selected portions of the audio signals defined by the refined entry and exit point words are then combined as previously discussed.

In another embodiment, the two sets of keys 456 and 458, and preview, edit, shuttle and stop keys, shown generally as 460 may be replaced with a single keyboard in which the respective keys are assigned to control a given transport in response to control signals activated by other appropriate keys.

Accordingly, in operation, the system operator will place the transports in the playback mode and will listen to the recorded signals as in the fully automated embodiment in order to select tentative entry and exit points by pushing the edit locate key on keyboard 454, causing the transfer of the tape position location and the time code information to the controller 440 respectively, as in the fully automated embodiment. Next, the transports are energized to shuttle the tape over the selected spots based on the stored tape position location. As the tape is shuttled, the operator then further selects more desired or refined entry and exit edit points by pressing the time advance or retard keys 456 and 458 on keyboard 454 which advances or retards the time, i.e. spatial location of the selected audio portions and the tentative edit point words as appropriate, until no further adjustment is desired. The tape is again shuttled and the audio signals from both channels are replayed in combined form based on the refined entry and exit edit points to provide a preview of the edit signals. In the event this preview indicates that the edit location is still not desirable, the tape is again shuttled and the time advance or retard keys used to further refine the selected entry and exit edit points. When a satisfactory preview is achieved, an edit key 460 on keyboard 454 is depressed, thus causing the controller 440 to combine the signals.

Since the designated edit points may be at different locations upon different tape media, there is a need to provide high speed search and locate function to quickly locate and synchronize the desired edit points to enable a splice to be made. Once the precise edit points have been designated, the controller is instructed to search the tape media for the gross position of the exit or entry edit point by searching first with the tape position indicators 407 and 408 to locate the approximate point on the media where the edit point is located. Next, the controller 440 reads the time code from each respective record media, bringing the frames containing the respective edit points into synchronization, and instructs a selected transport to vary its capstan speed such that the edit points are synchronized on the two media. At this point, the controller instructs the transports to transfer data between designated channels when the data words corresponding to the edit points are detected. Once the edit points have been reached, the controller switches data between designated channels, which begins the copying process and thus performs the editing process.

In a typical situation, the system of the present invention may thus be utilized in a master recording studio where multiple "takes" prepared during one or more recording sessions may be edited and desired portions from the respective takes combined to form a composite master recording. In such a situation, the following sequence of operations will then occur:

(1) a first master tape will be created during a first recording session.

(2) a first master will be reproduced and "bad" sections needed to be re-recorded will be noted, such as by marking a corresponding musical score.

(3) a second, or back-up master tape will then be created in a second recording session, in which at least the "bad" sections are again performed and recorded as a secondary master.

(4) the first master tape is played on one recorder, thus designated the play recorder and signals reproduced therefrom are duplicated onto a blank tape on another recorder, thus designated the record recorder, to become the composite master tape, stopping at some arbitrary point into the "bad" portion.

(5) the secondary master is iteratively played back and forth on the record recorder to first establish a tentative exit edit point proximate to the start of the "bad" section and then to refine the exit edit point, at which time the corresponding time code data is transferred to memory as the refined exit edit point word.

(6) the back-up master tape is next iteratively played on the play recorder to first establish a tentative entry edit point on the secondary back-up master which complements the exit edit point previously selected from the duplicated first master, and then to refine the entry edit point, at which time the corresponding time code data is transferred to memory as the refined entry edit point word.

(7) next, a preview mode is activated in which both recorders are synchronized together in their respective play modes and the tapes on both are shuttled back and forth to position both tapes such that the spatial position of the audio signals on one tape which is defined by the exit edit point word is precisely aligned with the spatial position of the audio signals on the other tape defined by the entry edit point word. The audio signals previously rerecorded onto the composite master tape and preceeding the exit edit point are thus audibly displayed with automatic termination of that display at the spatial location in that signal defined by the stored refined exit edit point word, and immediately following and upon command of the entry edit point word the signals reproduced from the secondary master on the play recorder are automatically inserted, there being no apparent break in the audible display of the two signal portions. Desirably, the reproduced signal from the play recorder is coupled to the record recorder and the output therefrom is used to provide the audible display, thus ensuring proper coupling of signals from the play recorder to the record recorder.

(8) The preview mode thus enables an audible display of the audio signals exactly as they will be combined based on the refined exit and entry edit points. If the edit point is still found to be faulty, steps 5, 6 and 7 above may be repeated as necessary.

(9) the composite master tape is then completed by essentially repeating the operation in the previous mode, but by activating the final edit operation, causing the record recorder to automatically switch to its record mode upon cue from the finalized exit/entry edit point word, thus causing the signals from the secondary or back-up master to be recorded on the component master tape in place of whatever portion of the first master recording following the exit edit point had been recorded thereon.

In a further embodiment, a cross-fade feature is also provided. In such case, steps 8 and 9 above are modified in that fade-out is initiated by operating on the master signal received from the play head on the record recorder to produce, in real time, a digital fade-out signal in which the digitaly encoded audio signal amplitude progressively decreases, beginning at normal amplitude at frame $N-32$, reaching ½ normal amplitude at frame N, and decreasing to 0 amplitude at frame $N+32$, where frame N is defined by the refined, finalized exit edit point word, and is, in fact, the time code signal corresponding to that frame.

Conversely, fade-in is initiated by operating on the backup signal received from the play head on the play recorder to also produce, in real time, a digital fade-in signal in which the digitally encoded audio signal amplitude progressively increases, beginning at 0 amplitude at frame $N'-32$, reaching ½ normal amplitude at frame N' and reaching normal amplitude at $N'+32$, but where frame N' is defined by the refined, finalized entry edit point word.

The digital fade-out and fade-in signals provided in the above steps are then electrically summed to provide a composite digital cross-fade signal of relatively constant equivalent amplitude which at frame $N-32$ is wholly derived from the duplicated master, which at frame N/N' is equally derived from both the duplicated master and the backup master, and which at frame $N'+32$ is wholly derived from the backup master.

Finally, assuming the preview mode indicates that the edit point is appropriate, the composite signal is recorded onto the duplicated master tape beginning at frame $N-32$ and ending at frame $N+32$, then continuing recording directly from the backup master in place of the "bad" signal originally present to provide a superior composite digitally encoded audio signal in which any abrupt transitions between the two portions are avoided. If the digitally encoded audio signals are formatted in frames together with such redundant data as will enable subsequent error correction, such as is, for example, disclosed in U.S. Pat. No. 4,145,683 (Brookhart) further care must be given to ensure appropriate error corection in the composite signal. Thus, when the cross faded signals are generated and rerecorded, new parity information is also generated such that appropriate error correction techniques may be performed on the composite edited signals. Since there is a spatial separation in many error correction methods, the rerecording must begin a sufficient number of frames prior to the beginning of the cross fade to ensure that proper parity data is being recorded along with the actual digitally encoded audio signals.

I claim:

1. A method for editing and combining selected portions of digitally encoded audio signals recorded on at least one record medium to form a composite digitally encoded audio signal, comprising the steps of
    (a) reproducing signals digitally recorded on said at least one record medium to present audible displays of audio signals recorded on said at least one medium,
    (b) operating in response to said audible displays to designate tentative entry and exit edit point words defining the spatial locations of selected portions of said reproduced signals to be joined in sequence to form said composite signal,
    (c) storing the tentative edit point words defining said spatial locations,
    (d) presenting audible displays of selected portions of the audio signals which are proximate to said spatial locations defined by said tentative edit point words,
    (e) iteratively refining said spatial locations defined by said edit point words in steps of discrete time intervals of decreasing duration by operating in response to repeated audible displays of the selected portions of the audio signals to establish increasingly refined entry and exit edit points,
    (f) storing the refined edit point words, and
    (g) switching between audio signals located on said at least one medium at spatial locations defined by said refined edit point words to sequentially join selected portions of said signals at the thus defined spatial locations to thereby form said composite digitally encoded audio signal.

2. A method according to claim 1, for editing and combining selected portions of digitally encoded audio signals recorded on one channel of a record medium on another channel of which is recorded a digital signal train representing time code data each segment of which identifies the spatial location of a corresponding segment of digitally encoded audio signal recorded on said another channel, said method further comprising the steps of
    reproducing digital signals corresponding to said recorded time code data,
    iteratively operating on said reproduced time code related signals in response to said audible displays to designate selected segments thereof as said tentative and refined exit and entry edit point words,
    storing said selected segments designated as edit point words,
    operating under control of said stored selected segments to combine portions of said digitally encoded audio signals to form said composite audio signal, and
    forming a record of said composite signal on at least one channel of said record medium.

3. A method according to claim 1 for editing and combining selected portions of digitally encoded audio signals positioned in a succession of frames containing a predetermined number of data words representing the digital equivalents of increments of analog signals, comprising the further steps of
    (a) progressively modifying the digital representation of a first predetermined number of frames of digitally encoded audio signals recorded on said at least one record medium preceding and following said exit point word to form a digital fade-out signal in which the digitally encoded audio signal within said first predetermined number of frames gradually decreases to zero amplitude at the last frame following said exit edit point word,
    (b) progressively modifying the digital representation of a second predetermined number of frames of digitally encoded audio signals recorded on said record medium preceding and following said entry edit point word to form a digital fade-in signal in which the digitally encoded audio signal within said second predetermined number of frames gradually increases from zero amplitude at the first frame preceding said entry edit point word to its original digital state at the last frame following said entry edit point word,
    (c) electrically summing in real time said digital fade-out and fade-in signals to provide a composite digital cross-fade signal of relatively constant equivalent amplitude, which at the first frame of the first predetermined number of frames preceding said exit edit point word is wholly derived from the first set of audio signals and which at the last frame of the second number of predetermined frames following said entry edit point word is wholly derived from the second set of audio signals, and
    (d) recording onto a record medium digital signals derived from said first set of signals ending with the frame immediately preceding the first frame of said first predetermined number of frames, recording thereafter said cross-fade signal and recording after said cross-fade signal signals derived from said second set of signals beginning with the frame immediately following the last of the second number of predetermined frames following said entry edit point word.

4. A method according to claim 1, wherein said switching step comprises
    operating on said selected portions of said audio signals to directly rerecord said portions onto another channel of record medium to provide a final edited composite digitally encoded audio signal.

5. A method according to claim 4, wherein said selected portions are located on first and second record media and wherein said switching step comprises
    synchronizing the motion of both media with respect to associated playback transducers such that the refined entry edit point word on one of said channels is sensed immediately following the sensing of the refined exit point word on the other of said channels, and
    directly recording onto a channel of record medium at least one said selected portion to provide on a single channel of record medium said composite signal consisting of said both components of said selected portions of digitally encoded audio signals.

6. A method for editing and combining selected portions of digitally encoded audio signals recorded on a first and on a second record medium to form a composite digitally encoded audio signal, comprising the steps of (a) presenting audible displays of audio signals recorded on said first and second media, (b) operating in response to said audible displays to designate a tentative exit edit point word defining the spatial location of the end of a first portion of a displayed audio signal reproduced from said first medium and a tentative entry edit point word defining the spatial location of the beginning of a portion of another displayed audio signal reproduced from said second medium to be joined in sequence after said first portion to form said composite signal, (c) storing the tentative edit point words, (d) presenting an audible display of selected portions of the audio signals which are proximate to said tentative edit point words, (e) iteratively refining the spatial location defined by the edit point words in steps of discrete time intervals of decreasing duration in response to repeated audible displays of the selected portions of the audio signals to establish increasingly refined exit and entry edit points, (f) storing the refined edit point words, and (g) synchronously playing said first and second media and combining selected portions of the audio signals as defined by the refined edit point words to form a composite audio signal by switching between audio signals located on said separate channels at the spatial locations defined by said refined edit point words.

7. A method according to claim 6, further comprising the steps of (a) progressively modifying the digital representation of a first predetermined number of frames of digitally encoded audio signals recorded on said first medium preceding and following said exit edit point word to form a digital fade-out signal in which the digitally encoded audio signal amplitude within said first predetermined number of frames gradually decreases to zero amplitude at the last frame following said exit edit point word, (b) progressively modifying the digital representation of a second predetermined number of frames of digitally encoded audio signals recorded on said second medium preceding and following said entry edit point word to form a digital fade-in signal in which the digitally encoded audio signal amplitude within said second predetermined number of frames gradually increases from zero amplitude at the first frame preceding said entry edit point word to its original digital state at the last frame following said entry edit point word, (c) electrically summing in real time said digital fade-out and fade-in signals to provide a composite digital cross-fade signal of relatively constant equivalent amplitude, which at the first frame of the first predetermined number of frames preceding said exit edit point word is wholly derived from the first set of audio signals and which at the last frame of the second number of predetermined frames following said entry edit point word is wholly derived from the second set of audio signals, and (d) recording onto a record medium digital signals derived from said first set of signals ending with the frame immediately preceding the first frame of said first predetermined number of frames, recording thereafter said cross-fade signal and recording after said cross-fade signal signals derived from said second set of signals beginning with the frame immediately following the last of the second number of predetermined frames following said entry edit point word.

8. A method for editing and combining selected portions of digitally encoded audio signals recorded on separate channels on record medium to form a composite digitally encoded audio signal, comprising the steps of (a) iteratively reproducing on a first digital audio recorder audio signals recorded on a first of said channels to provide an audible display thereof and refining in steps of discrete time intervals of decreasing duration an increasingly refined exit edit point which defines the spatial location of the end of a portion of that signal to be sequentially followed by a portion of a signal from a second channel;

(b) storing digital information representative of said exit edit point;

(c) iteratively reproducing on a second digital audio recorder audio signals recorded on said second of said channels and refining in steps of discrete time intervals of decreasing duration an increasingly refined entry edit point which defines the spatial location of the beginning of a signal portion to sequentially follow the end of the signal portion defined by the exit edit point;

(d) storing digital information representative of said entry edit point;

(e) previewing a proposed edited composite signal by (i) synchronously reproducing on said first recorder audio signals recorded on said first channel proximate to said spatial location defined by said exit edit point and reproducing on said second recorder audio signals recorded on said second channel proximate to said spatial location defined by said entry edit point, and (ii) coupling output signals from both recorders to provide an audible display and automatically switching from the output signal from the first recorder to that from the second recorder upon command of an edit signal derived from the stored representations of said exit and entry edit points, and (f) completing a desired edited composite by repeating said synchronous playing of signals from said first and second channels on said first and second recorders respectively and automatically switching said first recorder into its record mode upon command of said edit signal to cause digitally recorded signals from said second channel occurring after said entry edit point to be recorded on said first channel following the end of the playing of signals on said first channel as designated by the exit edit point.

9. A method of editing and combining selected portions of digitally encoded audio signals recorded on separate channels of record medium to form a composite audio signal comprising the steps of (a) recording onto one channel of a first record medium digitally encoded audio signals partitioned in a succession of frames containing a predetermined number of data words representing the digital equivalents of increments of analog audio signals and recording onto another channel of said first medium digitally encoded spatial location identifying signal codes likewise partitioned into a succession of frames of equal length as the audio signal frames, the digital code within each spatial location identifying frame corresponding to a unique audio signal frame recorded on said one channel, (b) recording onto a one channel of a second record medium digitally encoded audio signals partitioned into a like succession of frames containing the same number of data words and recording onto another channel of said second record medium similarly partitioned frames of digitally encoded spatial location identifying signals each of which identifies the spatial location of a unique audio signal frame recorded on said one channel of the second medium, (c) iteratively playing on a first digital audio recorder audio signals recorded on said one channel of said first medium and determining in steps of discrete time intervals of decreasing duration a location identifying digital signal which represents an increasingly refined exit edit point corresponding to the end frame of a signal portion to be followed by a signal portion from another recording;

(d) storing said digital signal representing said exit edit point;

(e) iteratively playing on a second digital audio recorder audio signals recorded on said one channel of said second medium and determining in steps of discrete time intervals of decreasing duration a location identifying digital signal which represents an increasingly refined entry edit point corresponding to the beginning frame of a signal portion recorded on second medium to follow the end of the signal portion recorded on the first medium coresponding to the exit edit point;

(f) storing said digital code identifying said entry edit point;

(g) previewing a proposed edited composite signal by
 (i) synchronously playing on said first and second recorders audio signals recorded on and first and second media respectively, and
 (ii) coupling output signals from both recorders to provide an audible display and automatically switching from the output signal from the first recorder to that from the second recorder upon command of an edit signal derived from the stored digital codes corresponding to said exit and entry edit points, and (h) completing a desired edited composite by repeating said synchronous playing of signals from said first and second recorders respectively and automatically switching said first recorder into its record mode upon command of said edit signals to cause digitally recorded signals from said second medium starting with said beginning frame as designated by the entry edit point to be recorded on said first channel of said first medium following the end of the playing of said end frame as designated by the exit edit point.

10. A method according to claim 1, further comprising the step of retrieving said selected portions of said reproduced signals and storing said selected portions, such that said audible displays may thereafter be generated from said stored selected portions.

11. A system for editing and combining selected portions of digitally encoded audio signals recorded on separate record media to form a composite digitally encoded audio signal, comprising (a) transport means for controllably positioning each of said record media along a respective transport path to enable signals to be recorded on and reproduced from each of said media, (b) read/write means associated with said transport means for recording or reproducing digitally encoded audio signals and related time code data on or from said record media, (c) keyboard means for
 (i) inputting digital control instructions,
 (ii) designating tentative and refined exit and entry edit point words defining the spatial location of selected portions of said digitally recorded audio signals and
 (iii) modifying said exit and entry edit point words, (d) timing means for enabling the spatial location defined by said edit point words to be advanced or delayed in a plurality of discrete time intervals of decreasing duration during repeated shuttling of said media on said transport means and the presenting of audible displays of the audio signals proximate to said edit points to determine refined exit and entry edit point words, (e) means for storing said edit point words, (f) means for locating and aligning designated channels at the spatial locations defined by said refined edit point words, and (g) means for effecting selective transfer of signals reproduced from the respective record media at the spatial locations defined by said refined edit point words to combine said selected portions of digitally encoded audio signals to form a composite signal.

12. A system according to claim 11, further comprising means for presenting an audible preview of a proposed edit contructed from selected portions of audio signals from both of said separate media in which the audible display is merged at the spatial locations defined by said refined edit point words, thereby enabling a further refinement of the edit points by iterative shuttling of both media, modifying the edit point words and again previewing the proposed edit point.

13. A system according to claim 11, wherein said transfer means comprises means for operating on said selected portions of said audio signals to directly record said portions onto another channel of record medium to provide a final edited composite digital audio signal.

14. A system according to claim 11 wherein said transfer means further comprises means for synchronizing the motion of both media with respect to associated playback transducers such that the refined entry edit point word on one of said channels is sensed immediately following the sensing of the refined exit edit point word on the other of said channels, means for directly recording onto a channel of record medium at least one said selected portion to provide on a single channel of record medium said composite signal consisting of said both components of said selected portions of digitally recorded audio signals.

15. A system according to claim 11, for editing and combining selected portions of digitally encoded audio signals recorded on one channel of a record medium on another channel of which is recorded a digital signal train representing time code data each segment of which identifies the spatial location of a corresponding segment of digitally encoded audio signal recorded on said another channel, said system further comprising the steps of

- means for reproducing digital signals corresponding to said recorded time code data,
- means for iteratively operating on said reproduced time code related signals in response to said audible displays to designate selected segments thereof as said tentative and refined exit and entry edit point words,
- means for storing said selected segments designated as edit point words,
- means for operating under control of said stored selected segments to combine portions of said digitally encoded audio signals to form said composite audio signal, and
- means for forming a record of said composite signal on at least one channel of said record medium.

16. A system according to claim 11 for editing and combining selected portions of digitally encoded audio signals partitioned in a succession of frames containing a predetermined number of data words representing the digital equivalents of increments of analog signals, comprising (a) means for progressively modifying the digital representation of a first predetermined number of frames of digitally encoded audio signals recorded on said at least one record medium preceding and following said exit point word to form a digital fade-out signal in which the digitally encoded audio signal amplitude within said first predetermined number of frames gradually decreases to zero amplitude at the last frame following said exit edit point word, (b) means for progressively modifying the digital representation of a second predetermined number of frames of digitally encoded audio signals recorded on said record medium preceding and following said entry edit point word to form a digital fade-in signal in which the digitally encoded audio signal amplitude within said second predetermined number of frames gradually increases from zero amplitude at the first frame preceding said entry edit point word to its original digital state at the last frame following said entry edit point word, (c) means for electrically summing in real time said digital fade-out and fade-in signals to provide a composite digital cross-fade signal of relatively constant equivalent amplitude, which at the first frame of the first predetermined number of frames preceding said exit edit point word is wholly derived from the first set of audio signals and which at the last frame of the second number of predetermined frames following said entry edit point word is wholly derived from the second set of audio signals, and (d) means for recording onto a record medium digital signals derived from said first set of signals ending with the frame immediately preceding the first frame of said first predetermined number of frames, recording thereafter said cross-fade signal and recording after said cross-fade signal signals derived from said second set of signals beginning with the frame immediately following the last of the second number of predetermined frames following said entry edit point word.

* * * * *